United States Patent [19]

Tsunekawa et al.

[11] 4,076,977
[45] Feb. 28, 1978

[54] LIGHT MEASURING CIRCUIT WITH STRAY CAPACITANCE COMPENSATING MEANS

[75] Inventors: Tokuichi Tsunekawa, Yokohama; Tetsuya Taguchi, Kawasaki, both of Japan

[73] Assignee: Canon Kabushiki Kaisha, Tokyo, Japan

[21] Appl. No.: 644,317

[22] Filed: Dec. 24, 1975

[30] Foreign Application Priority Data

Dec. 28, 1974 Japan .................................. 49-2479
Jul. 2, 1975 Japan ................................. 50-82116

[51] Int. Cl.$^2$ ......................... H01J 39/12; G01J 1/32
[52] U.S. Cl. .................................. 250/206; 307/311; 307/246; 354/60 R
[58] Field of Search ................... 250/214 R, 206, 207, 250/208; 328/162; 307/311, 246; 354/50, 51, 60 R

[56] References Cited

U.S. PATENT DOCUMENTS

| | | |
|---|---|---|
| 3,523,189 | 8/1970 | Hansen et al. .................. 250/214 R |
| 3,655,987 | 4/1972 | Hinds ............................. 250/214 R |
| 3,743,837 | 7/1973 | Pooley et al. .................... 250/214 R |
| 3,813,539 | 5/1974 | Sioma ............................. 250/214 R |
| 3,835,313 | 9/1974 | Stiefelmeyer et al. .......... 250/214 R |
| 3,872,329 | 3/1975 | Dodson ........................... 250/214 R |

Primary Examiner—Alfred E. Smith
Assistant Examiner—David K. Moore
Attorney, Agent, or Firm—Toren, McGeady and Stanger

[57] ABSTRACT

The present invention relates to a light measuring circuit consisting of an operational amplifier, a feed back path connected with said operational amplifier, a photo voltaic cell and a switching circuit for bringing the input terminals of said operational amplifier to the same potential at the time light measurement is commenced. By means of this switching circuit connected to the light measuring circuit the delayed response of the light measuring circuit due to the stray capacitance existing between the input terminal of the operational amplifier and ground is remarkably improved.

31 Claims, 14 Drawing Figures

LIGHT MEASURING CIRCUIT WITH STRAY CAPACITANCE COMPENSATING MEANS

BACKGROUND OF THE INVENTION

1. Field of the Invention

The present invention relates to a light measuring apparatus, particularly presenting a circuit that improves the response characteristics of the apparatus.

2. Description of the Prior Art

A light measuring circuit for producing an electrical signal in accordance with the brightness to be measured, presenting an operational amplifier, a feed back path and a photo voltaic cell is already known.

However, in such a light measuring circuit it takes considerable time before the output of the measuring circuit is stabilized when measuring low light levels even if a photo voltaic cell is adapted as the light sensitive element, which is very inconvenient. Namely, when the light measuring circuit is activated and the photo voltaic cell produces an electrical signal, the stray capacitance existing in the operational amplifier is charged with this electrical signal or the charge present in the stray capacitance is discharged, so that especially when the light to be measured is suddenly reduced in intensity it takes considerable time before the output of the above mentioned light measuring circuit is stabilized, which is very inconvenient.

SUMMARY OF THE INVENTION

The first purpose of the present invention is to offer a light measuring circuit with quick response characteristics.

The second purpose of the present invention is to offer a light measuring circuit which is free from the undersirable feature of the above mentioned conventional device, by connecting a mechanical device to the light sensitive element.

The third purpose of the present invention is to offer a light measuring circuit which is free from the undersirable feature of the above mentioned conventional device, by connecting an electrical circuit to the input terminal of the operational amplifier.

The fourth purpose of the present invention is to offer a light measuring circuit which is free from the undersirable feature of the above mentioned conventional device, by providing a charge circuit for quickly charging the stray capacitance of the operational amplifier.

The fifth purpose of the present invention is to offer a light measuring circuit which is free from the undersirable feature of the above mentioned conventional device, by providing a discharge circuit for quickly discharging the charge stored in the stray capacitance of the operational amplifier.

Further purposes will be disclosed from the explanation to be made below in accordance with the accompanying drawings.

DESCRIPTION OF THE PREFERRED EMBODIMENTS

Figure 1:
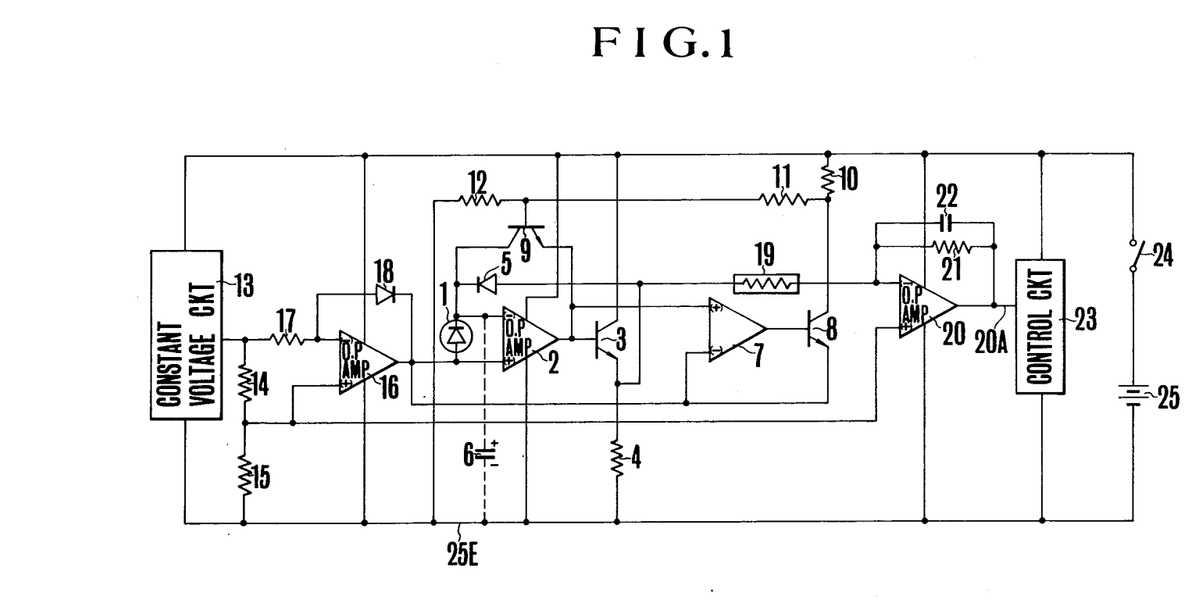
FIG. 1 shows a circuit diagram of the first embodiment of the light measuring circuit in accordance with the present invention.
Figure 2:
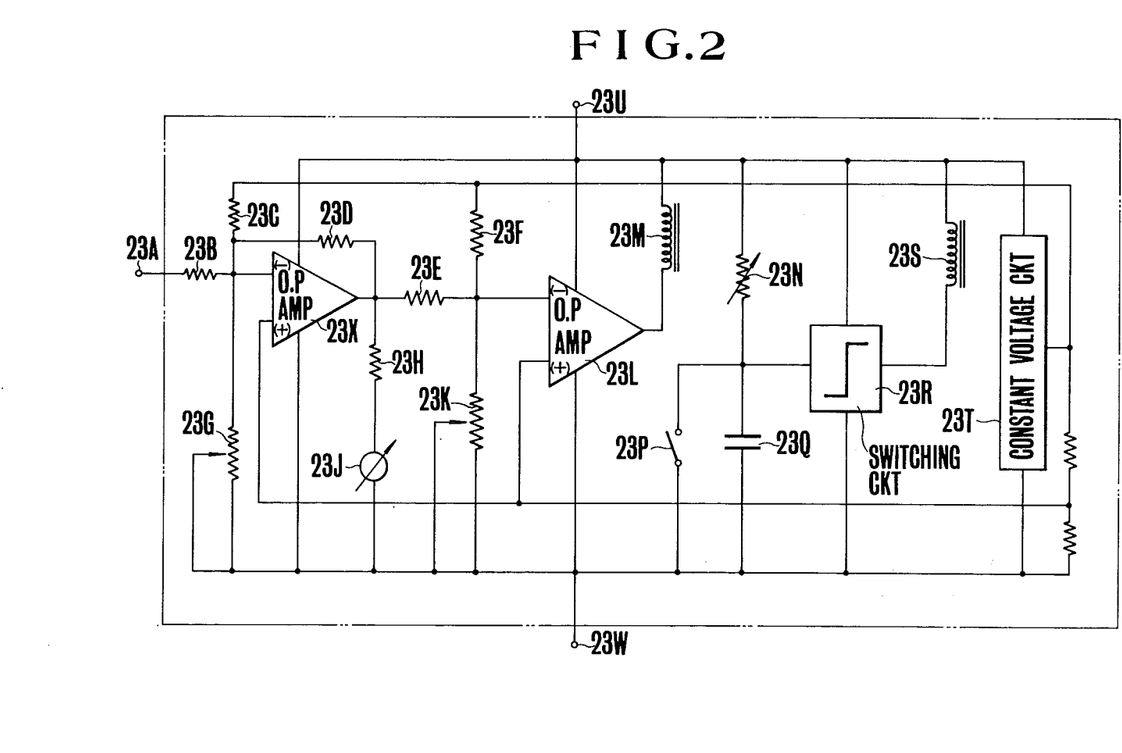
FIG. 2 shows a circuit diagram of an embodiment shown in FIG. 1.

FIG. 1 shows a circuit diagram of the first embodiment of the present invention applied for a camera. In the drawing, 1 is a light sensing element consisting of a photo voltaic element such as silicon diode which provides a superior response characteristics. Element 2 is an operational amplifier which uses field effect transistor (hereinafter called FET) at the input and provides a high input impedance. An npn type transistor 3 is connected to the output terminal of 2. A resistance 4 is connected to the emitter electrode of the transistor 3, while a logarithmically compressing diode is connected to the feed back path, whereby by means of these elements the brightness of the object to be photographed is converted into an output voltage proportional to the logarithm of the brightness of the object. Shown in dashed lines is the stray capacitance 6 between the inverting input terminal (−) of the operational amplifier and ground 25E, unavoidably provided during the manufacturing process of the circuit elements. Element 7 is the comparator, 8 the npn type transistor and 9 the npn type transistor composing the discharge circuit. Elements 10, 11 and 12 are the resistances for bias level setting. Hereby the circuit for improving the response characteristics is composed of the above mentioned elements from 7 to 12. The elements from 13 to 19 form a temperature compensating circuit for the above mentioned light measuring circuit, whereby 13 is the constant voltage source for bias level setting, 16 the operation amplifier, 18 the diode for the temperature compensation and 14, 15 and 17 the resistances for compensating the temperature in such a manner that a bias current equal to the photoelectric current that would normally occur in the light sensing element 1 at the standard brightness for the temperature compensation flows through the diode 18. Further, 19 is a resistance element presenting a positive temperature coefficient. The elements from 20 to 22 compose the circuit for avoiding the noise (flicker noise) due to a flickering light source such as fluorescent lamp for illuminating the object to be photographed if the light sensing element 1 provides high speed response characteristics, whereby 20 is the operational amplifier and 21 and 22 are respectively a capacitor and a resistor provided in the feed back path for composing a time constant circuit for preventing the flicker noise. Element 23 is the exposure amount control circuit which consists of such elements as shown in FIG. 2. In FIG. 2, 23A is the terminal to be connected to the output terminal 20A of the operation amplifier 20 shown in FIG. 1, 23B, 23D, 23E and 23F the resistances, 23G the resistance presenting a value corresponding to the photographic information such as for example, the shutter time, the film sensitivity and so on, 23H the adjusting resistance, 23J the meter for indicating the aperture value, 23K the resistance functionally engaged with a diaphragm not shown in the drawing, 23L the comparator, 23M the diaphragm control magnet, 23N the resistance presenting a value corresponding to the preset shutter speed, 23P the switch connected in parallel to the capacitor 23Q, and 23R the switching circuit being connected to the output terminal of the time constant circuit consisting of 23N and 23Q, whereby for example a Schmitt trigger circuit is often used. 23S is the trailing curtain control magnet for the shutter, not shown in the drawing, 23T the constant voltage circuit, 23V the current source terminal to be connected to the positive electrode of the battery 25 through the current source switch 24 shown in FIG. 1 and 23W the terminal to be connected to the negative electrode of the battery 25.

Next, the operation of the device composed as explained above will be explained.

Generally the bipolar transistor is superior to the field effect transistor in its transient response characteristics and therefore often operates more rapidly than the circuit consisting of the FET so as to cause an abnormal charge. When the current source switch 24 shown in the drawing is closed, the bipolar transistor 3 conducts before the input stage consisting of the operational amplifier 2 is fully operational in such a manner that a current runs through the stray capacitance 6 between the inverting input terminal (−) of the amplifier 2 and ground 25E by means of the diode 5, so that the stray capacitance 6 is charged abnormally. When hereby the stray capacity 6 is charged, the potential of the non inverting input terminal (+) of the operation amplifier 2 is lower than that of the inverting input terminal (−). When hereby after the elapse of a certain determined time the amplifier 2 is fully operational, the transistor 3 stops conducting, whereby the potential of the output of the transistor 3 becomes almost zero (volt). Thus, the charging path to 6 is broken and 6 stops being charged. Hereby the charge stored in the stray capacity 6 remains undischarged, because the diode 5 and the photo voltaic element 1 are polarized oppositely to the charge in 6, which therefore can not be discharged through these elements 1 and 5. So far the operation of the conventional light measuring circuit has been described.

When the brightness of the object to be photographed is low, in the above mentioned light measuring circuit consisting of the elements from 1 to 6 it takes a considerable time for the output of the light measuring circuit to reach the normal state because the charge stored in the stray capacitance 6 is compensated by the photoelectric current produced in the photo voltaic element, while the photoelectric current itself is very small. However, in accordance with the present invention, it is proposed to provide a response improving circuit as explained above, so that even when the brightness of the object to be photographed is low the light measuring circuit resumes the normal state rapidly. Namely when the operational amplifier 2 is activated the potential at the output of the operational amplifier 2 is at the low level due to the charge stored in the stray capacitance 6, so that the potential of the non inverting input terminal (+) of the comparator 7 is lower than that of the inverting input terminal (−), in such a manner that the transistor 8 is non conductive state while the transistor 9 conducts. When the transistor 9 conducts, the charge stored in the stray capacitance 6 is discharged instantaneously through the collector electrode, and the emitter electrode of the transistor 9 and the base electrode and the emitter electrode of the transistor 3 in such a manner that due to the discharge of the stray capacitance 6 the potential of the inverting input terminal of the operation amplifier 2 reaches that of the non inverting input terminal of the amplifier 2 instantaneously. By means of the transistor 9 composing a discharge path the abnormal charge is discharged instantaneously in such a manner that the potential at the non inverting input terminal of the operation amplifier 2 becomes equal to that of the inverting input terminal. In other words, the operation amplifier 2 is brought in the normal state, the abnormal charge being discharged, when the base current of the transistor 3 starts to increase rapidly until the transistor 3 becomes completely conductive again, while at the same time the potential at the non inverting input terminal of the comparator 7 becomes higher than that at the inverting input terminal. Thus the transistor 3 is rendered conductive, while the transistor 9 assumes a non conductive state, whereby the discharge path consisting of the transistor 9, for the stray capacitance 6 is opened in such a manner that the stray capacitance 6 stops discharging.

As explained above, the discharge path 9 is provided in accordance with the present invention so that the charge stored in the stray condensor 6 reduces rapidly and thus the operational amplifier 2 is rapidly brought back to a normal operational state even if the brightness of the object to be photographed is low, whereby at the emitter electrode terminal of the transistor 3 a voltage corresponding to the brightness of the light beam reaching the photo voltaic element 1 is produced in a very short time after the closure of the current source switch 24.

Because hereby there is a danger that the exposure error should take place due to the leakage current of the transistor 9, the photoelectric current of the photoelectric transducing element 1 being remarkably small if the object brightness is low, the resistances 10 and 11 are set in such a manner that the base voltage of the transistor 9 is equal to the potential of the inverting input terminal of the operational amplifiers 2, 3, the saturation voltage of the transistor 8 being taken in consideration.

In the drawing, the elements from 13 to 18 are those for composing the circuit for compensating the temperature characteristics of the diode 5, whereby 13 is the constant voltage circuit, 19 the resistance presenting a positive temperature characteristics and 18 the diode for the temperature compensation.

Next, the temperature compensation effect will be explained. Suppose that the photoelectric current of the photo voltaic element 1 at the standard brightness for the temperature compensation is ips, the diode 5 has the same characteristics as that of the diode 18 for the temperature compensation and the resistance 17 is selected so as to allow the passage of the bias current corresponding to the photoelectric current ips through the diode 18. In this state, the voltage of the output of the constant voltage source 13, being divided by the resistances 14 and 15 is applied as the bias voltage Vc at the non inverting input terminals of the operation amplifiers 16 and 20. The output voltage $V_1$ of the operation amplifier 16 can be represented as follows $$V_1 = Vc - (KT/q) \cdot \ln((ips/iO) + 1) \quad (1)$$

whereby the offset voltage is neglected. Hereby io represents the saturation current in reversed direction of the diode 18, $K$ the Boltzmann coefficient, $T$ the absolute temperature and $q$ the charge of an electron.

Let the photoelectric current at an optional value of the object brightness be ip, so the output voltage $V_2$ of the amplifier 2, 3 can be represented as follows $$V_2 = V_1 + (KT/q) \ln((ip/iO) + 1) \quad (2)$$

This output voltage $V_2$ is produced between both ends of the emitter resistance 4 of the output transistor 3 and provided for the inverting input terminal (−) of the operational amplifier 20 together with the terminal voltage of the temperature compensation resistance 19. Let the value of the resistance 19 at the standard temperature To be Ro and the value of the feedback resistance 21 of 20 be RF, so the output voltage of the operational amplifier 20 can be represented as follows $$V_3 = Vc + (RF/Ro) \cdot (KTo/q) \ln(ips/ip) \quad (3)$$

because ips/io and ip/io are by far larger than 1 in such a manner that the output voltage $V_3$ of 20 assumes a constant value with regard to the temperature variation. Namely, the temperature can completely be compensated.

If a signal received by the light measuring circuit is mixed with the flicker noise (for example in sinusoidal wave form) after the operational amplifier 2, 3 has assumed a state, the output voltage $V_2$ of the operation amplifier 2, 3 contains an AC component represented below because the photo response speed of the photo voltaic element 1 is remarkably high, $$V_2 = E_1 + A \sin \omega t \quad (4).$$

This output voltage provided for the operational amplifier 20 through the resistance 19 as mentioned above. The negative feedback path of the operational amplifier 20 consists of the resistance 21 and the condenser 22 being connected parallel to each other, presenting such characteristics that the impedance of the feedback path becomes lower for the high frequency waves. Therefore, the gain of the operational amplifier 20 is lower in the range of the high frequency waves. When for example the R-C time constant of the feed back path is 5 ms, it is possible to reduce the gain at 100 Hz by about 10(dB) from the gain for DC with regard to the flicker frequency of 100 Hz of the flourescent lamp due to the DC source. Thus the flicker in the output of the operational amplifier is reduced to as small as three tenths of its normal value.

As explained above, the circuit in accordance with the present invention is sufficiently compensated for the temperature and protected against the influence of flicker in such a manner that the transient response characteristics is remarkably improved so as to obtain an excellent light measurement efficiency.

Below the exposure control operation will be explained in accordance with FIG. 2.

When at the terminal 23A the voltage produced at the output terminal of the operational amplifier 20 in accordance with the object brightness appears, the operational amplifier 23X operates on the object brightness information from terminal 23A with the film sensitivity set in the resistance and the shutter speed information so as to produce the aperture information in accordance with the brightness, shutter speed and film sensitivity information, whereby the aperture information is indicated by the meter 23J. When the shutter release button, not shown in the drawing, is pushed, the aperture set ring, not shown in the drawing, is rotated in such a manner that the wiper arm of the potentiometer 23K functionally engaged with the aperture set ring starts to move until the potentiometer 23K assumes the value corresponding to the aperture value. On the other hand, the voltage produced at the output terminal of the operational amplifier 23X in accordance with the aperture value is conducted to the inverting input terminal (−) of the comparator 23L composing the detector, while the aperture value information is conducted to the inverting input terminal (−) of the comparator 23L by means of the potentiometer 23K so that when the value of the resistance of potentiometer 23K comes to coincide with the aperture information produced by the operational amplifier 23X the output voltage of the comparator 23L becomes a high signal whereby the magnet 23M is no longer excited, when the engaging member, not shown in the drawing, and attracted by the magnet 23M is freed so as to stop the rotation of the aperture set ring. Thus the aperture is set at a value for obtaining a proper exposure. When the release button is further pushed down, the front shutter plane not shown in the drawing starts to run, the mirror, not shown in the drawing, goes up and the exposure starts. When the front shutter plane starts to run, the switch 23P functionally engaged with this front shutter plane is opened so as to start the charging of the capacitor 23Q. When the charging voltage of the capacitor 23Q reaches a certain determined value after the elapse of the time corresponding to the shutter speed set at the resistance 23A in advance, the switching circuit 23R is reversed in such a manner that the magnet 23S for controlling the rear shutter plane, not shown in the drawing, no longer excited, so as to allow the rear shutter plane to start to run and terminate the exposure.

Figure 3:
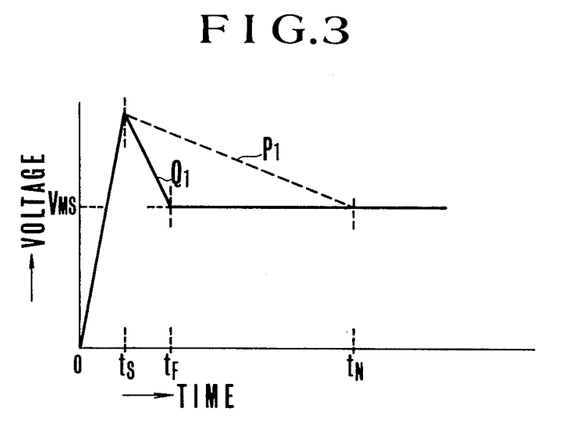
FIGS. 3 and 4 respectively shows the output characteristics of each part of the light measuring circuit shown in FIG. 1.
Figure 4:
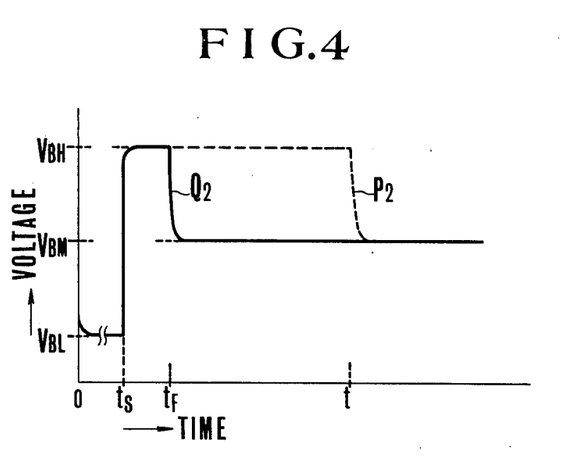

FIGS. 3 and 4 are diagrams for explaining the operation of the circuit shown in FIG. 1. In FIG. 3, the abscissa shows the time elapsed since the closure of the current source switch 24, while the ordinate shows the voltage at the inverting input terminal (−) of the operational amplifier 2, 3. $V_{MS}$ is the normal operating level of the operational amplifier 2, whereby $Q_1$ is the characteristics curve when the discharge circuit in accordance with the present invention is used while $P_1$ is the curve when the discharge circuit is not used. At the point in time $t_S$ the FET in the input stage of the operational amplifier 2 starts to operate. The transistor 3 is switched off and the abnormal charge of the stray capacitance 6 ceases. If the discharge circuit 7 − 12 in accordance with the present invention was not present, the charge stored in the stray capacitance 6 by means of the photoelectric current of the photo voltaic element 1 would be discharged in accordance with the curve $P_1$. Primarily at low brightness levels the transient response characteristics of the operational amplifier are so poor that it takes a long time $(t_N - t_S)$ for the potential at the inverting input terminal (−) of the amplifier 2 to reach the normal operational level $V_{MS}$. On the other hand, if the discharge circuit 7 − 12 in accordance with the present invention exists, the discharge transistor 9 is switched on and the abnormal charge in the stray capacitance 6 is discharged in a short time $(t_F)$ as is shown by the curve $Q_1$ so as to improve the transient response characteristics of the amplifier 6 remarkably.

FIG. 4 shows a response characteristics curve of the object brightness signal at an output of the flicker prevention circuit, whereby the temperature has been compensated. In other words the output signal of the operational amplifier 20, whereby the abscissa shows the time elapsed since the closure of the current source switch 24, while the ordinate shows the output voltage of the amplifier 20. Hereby $V_{BH}$ and $V_{BL}$ are respectively the higher and the lower saturation levels of the amplifier 20 while $V_{BM}$ is the normal output operating level. Others are same as those in FIG. 3, bearing the same symbols.

Figure 5:
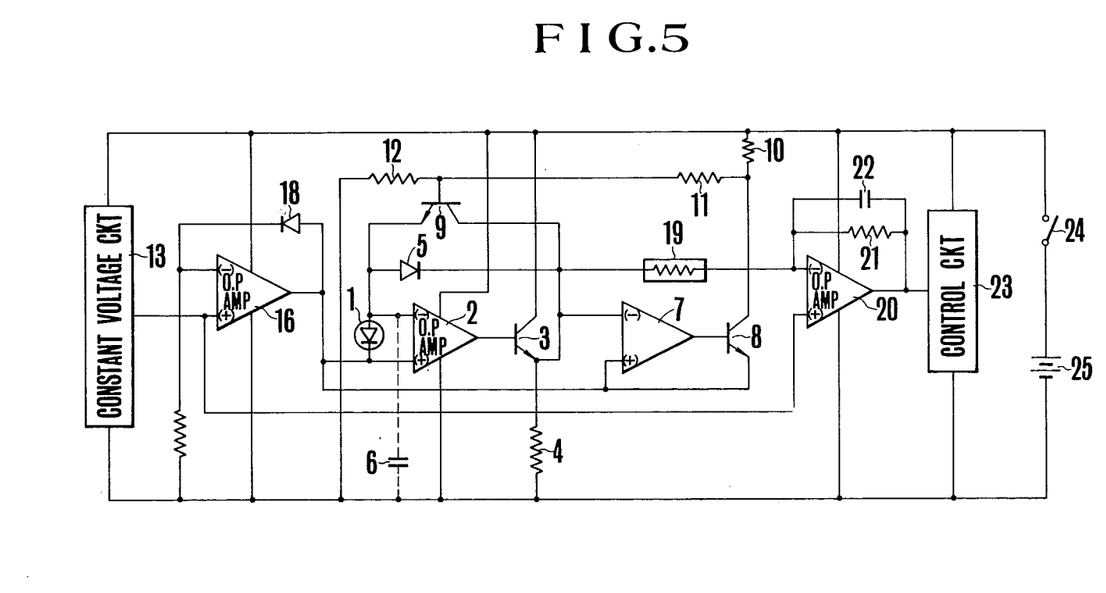
FIG. 5 shows a circuit diagram of the second embodiment of the light measuring circuit in accordance with the present invention.
Figure 6:
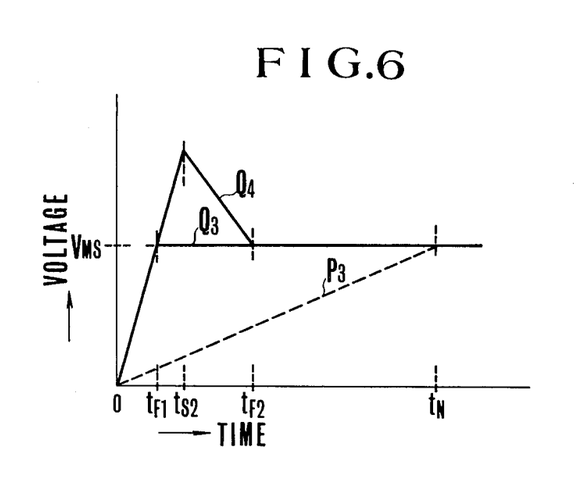
FIGS. 6 and 7 respectively show the output characteristics of each part of the light measuring circuit shown in FIG. 5.
Figure 7:
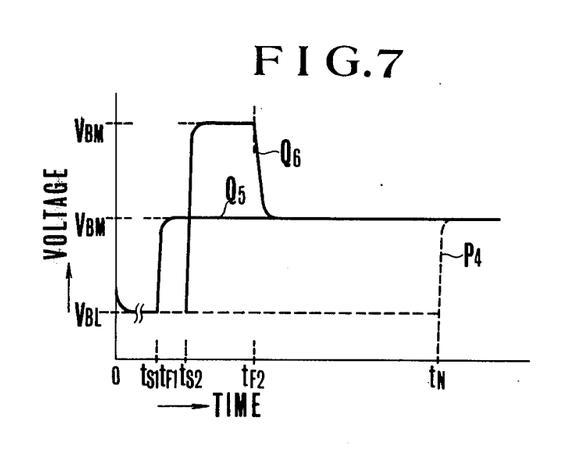

FIG. 5 shows a circuit diagram of the second embodiment of the light measuring circuit in accordance with the present invention. The same elements as in FIG. 1 are indicated by the same symbols, whereby their explanations are omitted. In the embodiment shown in FIG. 5 in order to prevent the over charging of the stray capacitance 6 through the transistor 3 and the diode 5, the polarity of the photo voltaic element 1 and that of the diode are reversed. In the circuit shown in FIG. 5, even if the transistor 3 is switched on before the FET composing the input stage of the amplifier 2 starts to operate, no abnormal charging of the stray capacitance 6 takes place because the diode 5 is connected in the reversed direction. However, when the object brightness is low and the photoelectric current produced in the photo voltaic element 1 is remarkably small it takes a considerable time for the amplifier 2 to reach the normal operational level, the stray capacitance 6 having being sufficiently charged so that in order to present such inconvenience the stray capacitance 6 is charged compulsorily. FIGS. 6 and 7 show the diagrams for indicating the transient response characteristics improving effect in the circuit shown in FIG. 5, whereby the same elements as in FIGS. 3 and 4 are indicated by the same symbols. In FIG. 5, when the current source switch 24 is closed, the transistor 3 is switched on before the FET forming the input stage of the operational amplifier 2 starts to operate, whereby the polarity of the diode 5 is reversed so that no abnormal charging from the transistor 3 takes place. At this time, the potential at the inverting input terminal (−) of the comparator 7 is higher than that at the non inverting input terminal (+), so that the transistor 8 in the output stage 8 is switched off state, while the charging transistor 9 is switched on in such a manner that the stray capacitance 6 is charged compulsorily through the transistor 9. When the FET forming the input stage of the amplifier 2 starts to operate before the in time point $t_{F_1}$ in FIG. 6 the inverting input terminal (−) of the operational amplifier 2 presents the transient response characteristics $Q_3$ in FIG. 6. When the FET forming the input stage of the amplifier 2 starts to operate the stray capacitance 6 is temporarily overcharged as is shown by the curve $Q_4$, whereby this abnormal charge is discharged instantaneously through the photo voltaic element 1 and the diode 5. If, as shown in FIG. 5, the transient response-characteristics improving circuit in accordance with the present invention does not exist, the stray capacitance 6 is charged as is shown by the curve $P_3$ with the photoelectric current corresponding to the object brightness so that the transient states appears for a long time, whereby the response of the light measuring circuit is delayed. FIG. 7 shows the diagram of the output of the operational amplifier 20 whereby $Q_5$, $Q_6$ and $P_4$ respectively correspond to $Q_3$, $Q_4$ and $P_3$ in FIG. 6.

Figure 8:
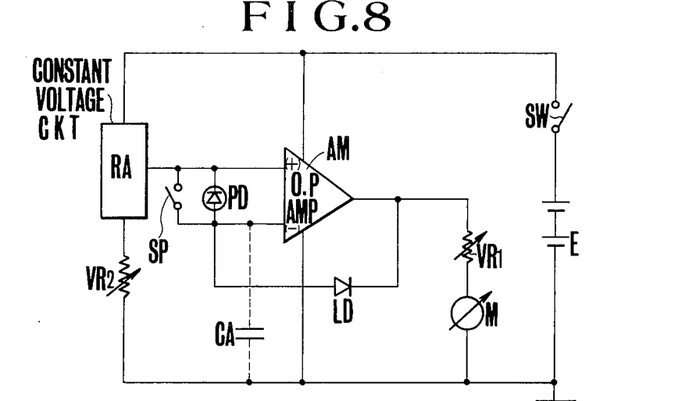
FIG. 8 shows a circuit diagram of the third embodiment of the light measuring circuit in accordance with the present invention.

As to the above mentioned embodiments, the transient response characteristics of the light measuring circuit is improved by means of the electrical circuit, while the abnormal charge is discharged by instantaneously and mechanically short circuiting the inverting input terminal of the high input impedance operational amplifier for light measurement with the non inverting input terminal or the output terminal. Next, the explanation will be made in accordance with the embodiment shown in FIG. 8. In FIG. 8, AM is the operational amplifier with a high input impedance, PD the photo voltaic cell for sensing the light beam from the object to be photographed, LD the diode for logarithmically compressing the photoelectric current produced by PD, M is the indicator such as a meter, $VR_1$ and $VR_2$ the adjusting resistances, E the battery and SW the current source switch, SP the switch for selectively charging the stray capacitance CA existing in the operational amplifier AM connected in parallel with PD, whereby, for example, the point contact type switch is adopted. RA is the level setting constant voltage source for the light measuring circuit.

Next, the operation of the light measuring circuit in accordance with the above mentioned composition will be explained. When the current source switch SW and the switch SP are closed, the stray capacitance CA is instantaneously charged by means of SW, RA and SP up to a certain determined potential. Thus the amplifier AM assumes the normal operational state instantaneously. SP is the point contact type switch, which is open circuited immediately after the closure, while at the output terminal of the operational amplifier AM a voltage corresponding to the object brightness and logarithmically compressed by the diode LD is produced so that the meter M indicates a value corresponding to the object brightness.

Figure 9:
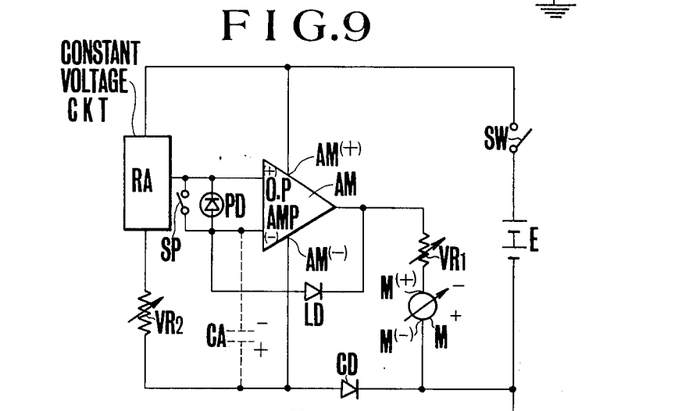
FIG. 9 shows a circuit diagram of the fourth embodiment of the light measuring circuit in accordance with the present invention.

FIG. 9 shows a circuit diagram of the fourth embodiment of the present embodiment. Hereby the elements having the same function as those in FIG. 8 are indicated by the same symbols, whereby their explanations are omitted. In FIG. 9, CD is the diode as a one way conductive element.

Figure 11:
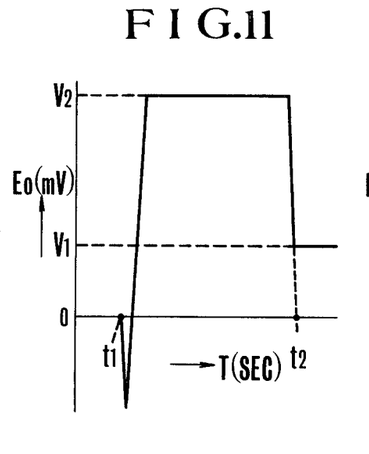
FIGS. 11, 12, 13 and 14 each respectively shows a diagram for explaining the operation of the light measuring circuits shown in FIGS. 9 and 10.

Next, the operation of the embodiment in FIG. 9 will be explained. At first the situation where the diode CD is not connected between the negative terminal M(−) of the meter M and the negative terminal AM(−) of the operation amplifier AM as is shown in FIG. 9 will be explained. If in FIG. 9, the diode CD is not provided, when the current source switch SW is closed a current from the current source E runs through the meter M through the current source switch SW, the positive current source terminal AM(+) of the operational amplifier AM, and the resistance $VR_1$. When a current runs through the meter M, a counter electromotive force is produced between both terminals of the meter M as is shown in FIGS. 9 and 11, so that the stray capacitance CA is oppositely charged, as is shown in FIG. 9. At the same time, the photoelectric current produced in the photo voltaic element PD conducted to the stray capacitance CA in such a manner that the reversed charge in the stray capacitance CA is gradually reduced by the photoelectric current. When however, the amount of light impinging on the photo voltaic element PD is small, in other words, the brightness of the object to be photographed is low, the photoelectric current produced in the photovoltaic element PD is small, so that it takes a remarkably long time for the reversed charge in the stray capacitance CA to be compensated and for the stray capacitance CA to be charged with the photoelectric current up to the normal bias voltage for the operational amplifier AM. Namely, when the diode CD is not provided it takes a considerably long time for the operational amplifier AM to assume the normal operational state.

In case however, the circuit is as is shown in FIG. 9, the counter electromotive force produced in the meter M is not conducted to the stray capacitance CA because the cathode electrode of the diode CD is connected to the negative terminal of the meter M so that the stray capacity is never oppositely charged. Thus, the photoelectric current produced in the photo voltaic element PD charges the stray capacitance from the zero potential up to a certain determined potential. When the potential of the stray capacitance CA reaches a certain determined value the operational amplifier AM assumes the normal operational state. As the result at the output terminal of the operational amplifier AM a voltage corresponding to the photoelectric current and logarithmically compressed by the diode LD is produced, whereby a driving current corresponding to the voltage produced at the output terminal of the operational amplifier AM runs through the meter M, which indicates the exposure value. When hereby the point contact type switch SP is connected in parallel with the photo voltaic element PD as is shown in FIG. 8 the stray capacitance CA is charged more quickly so that the response time of the light measuring circuit is further reduced.

Figure 10:
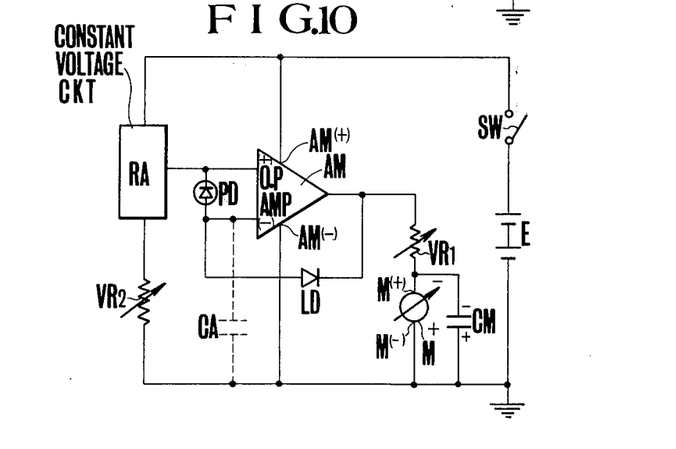
FIG. 10 shows a circuit diagram of the fifth embodiment of the light measuring circuit in accordance with the present invention.

FIG. 10 shows a circuit diagram of the fifth embodiment of the present invention. The elements with the same functions as those in FIG. 9 are indicated by the same symbols, whereby their explanations are omitted. In FIG. 10, CM is the capacitor provided between the positive terminal (+) of the meter M and the negative terminal M (−).

Next, the operation of the embodiment shown in FIG. 10 will be explained. When the current source switch SW is closed a counter electromotive force with the polarity as shown in the drawing is produced between both terminals of the meter M in the same way as in the embodiment shown in FIG. 9. However, the counter electromotive force produced in this meter is absorbed by the capacitor connected in parallel with the meter M in such a manner that almost no current runs through the stray capacitor CA. Thus the stray capacitance CA is not charged oppositely with the counter electromotive force produced in the meter, so that the response characteristics of the light measuring circuit becomes quicker. Other operations are same as those of the embodiment in FIG. 9 and therefore their explanations will be omitted.

Next, the embodiments shown in FIGS. 9 and 10 will be explained in accordance with FIGS. 11 to 14.

Figure 12:
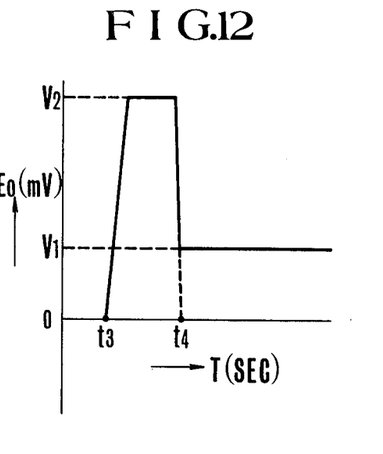

FIG. 11 shows the transient response characteristics of the light measuring circuit, whereby the response characteristics are not improved in accordance with the present invention, while FIG. 12 shows the response characteristics which are improved in accordance with the present invention.

The ordinates in FIG. 11 and FIG. 12 respectively show the voltage Eo at the output terminal of the operational amplifier AM while the abscissa shows the time.

When at the point in time $t = t_o$ the switch SW is closed in the light measuring circuit whose transient response characteristics is not improved a counter electromotive force is produced by the coil in the meter almost at the same time with the closure of the switch SW. Thus, at the output terminal of the operational amplifier AM a voltage lower than the ground potential is produced. Therefore the logarithm diode LD conducts in the forward direction while the stray capacitance is oppositely charged. As the result, the operational amplifier AM does not work normally until the reversed charge is compensated by the photoelectric current produced in the photo voltaic element PD and the stray capacitance is charged up to the normal potential, whereby the transient response time TR of the light measuring circuit until the operational amplifier AM operates normally is $(t_2 - t_1)$.

If the transient response characteristics of the light measuring circuit is improved by means of the method in accordance with FIGS. 9 and 10, the stray capacitance CA is not charged by the counter electromotive force produced in the meter so that the voltage Eo at the output terminal of the operational amplifier is as is shown in FIG. 12 and therefore no pulse in the reverse direction is produced. In consequence the stray capacitance CA is never charged abnormally, whereby the transient response time of the light measuring circuit is improved into a certain determined time $T_M$ namely $(t_4 - t_3)$ determined by the proper stray capacitance of the operation amplifier AM and the object brightness.

Further, in accordance with the present invention, the transient response characteristics when the object brightness changes abruptly in the operating state of the light measuring circuit are also improved. If the object brightness changes greatly and abruptly the voltage at the output terminal of the operational amplifier also changes greatly and abruptly so that in a manner similar to the case wherein the above mentioned current source switch SW is open and closed, an abnormal voltage is produced by the meter presenting an impedance means and the stray capacitance is charged abnormally by the thus produced abnormal voltage in such a manner that the transient response characteristics of the light measuring circuit are lowered.

Figure 13:
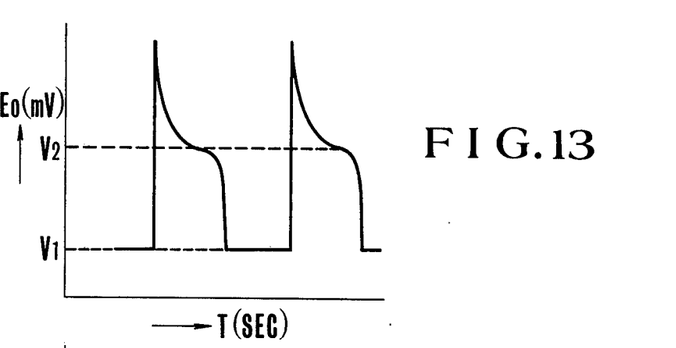
Figure 14:
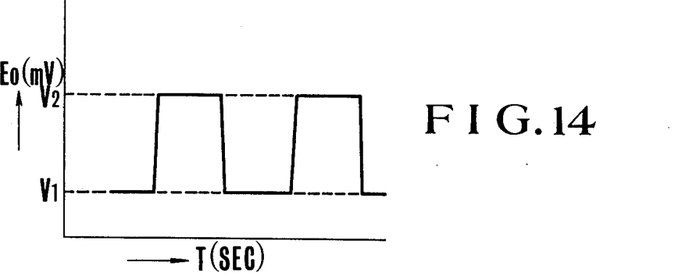

FIGS. 13 and 14 respectively show the transient response characteristics of the voltage at the output terminal of the operational amplifier AM when the object brightness changes greatly, periodically or in the rectangular wave form.

FIG. 13 shows the transient response characteristics of the output of the light measuring circuit, whereby the response characteristics is not improved in accordance with the present invention, while FIG. 14 shows the improved transient response characteristics of the light measuring circuit. In FIGS. 13 and 14 the ordinate shows the voltage Eo at the output terminal of the operational amplifier AM while the abscissa shows the time. As is clear from this drawing, the response characteristics is much improved for the variation of the brightness of the object to be photographed.

Further, the method to improve the transient response characteristics in accordance with the present invention contributes much to the improvement of the response characteristics of the light measuring circuit in case pictures are taken continuously by means of the motor drive especially when the object brightness is low.

In accordance with the present invention, the response characteristics of the light measuring circuit are much improved by providing a discharge circuit in such a manner that the charge stored in the stray capacitance is rapidly discharged until the potential at the input terminal of the light measuring operational amplifier reaches a certain determined value, or by providing a charge circuit in such a manner that the stray capacitance is rapidly charged until the potential at the input terminal of the light measuring operational amplifier reaches a certain determined value and therefore it can be said that the present invention is very effective for the light measuring circuit if pictures of the object with low brightness are taken at high speed. So far the method to improve the transient response characteristics lowered by the stray capacitance component unavoidably taking place during the manufacturing process of the operational amplifier while it goes without saying that the transient response characteristics lowered by the stray capacitance component taking place when the operational amplifier is mounted on a printed matter can also be improved.

What is claimed is:

1. A light measuring system comprising:
    (a) a photovoltaic cell means for producing a sensing output signal which represents the intensity of light incident thereon,
    (b) an amplifier means, said amplifier means being connected to said photo voltaic cell means, including a differential input circuit consisting of unipolar transistors, a bipolar type output stage means and a feedback path incorporating one way conductive means and being operative to produce a control signal in response to said sensing output signal,
    (c) a discharge circuit means connected to the differential input circuit to said amplifier means for discharging electric charges stored in a stray capacitor inherent in said amplifier means so that the amplifier means speedily reaches a stability condition, and
    (d) an output means connected to the bipolar type output stage means of said amplifier means.

2. A light measuring system according to claim 1, wherein said photo voltaic cell means includes a silicon photo diode.

3. A light measuring system according to claim 1, wherein the unipolar transistors of said amplifier means include field effect transistors.

4. A light measuring system according to claim 1, wherein the bipolar type output stage means of said amplifier means includes a bipolar transistor.

5. A light measuring system according to claim 4, wherein one way conductive means includes a diode for compressing the sensing output signal of said photo voltaic cell means.

6. A light measuring system according to claim 5, wherein the anode electrode of said diode is connected with the bipolar transistor.

7. A light measuring system according to claim 1, wherein said discharge circuit means discharges the electric charges stored in the stray capacitor for a certain determined time.

8. A light measuring system according to claim 1, wherein said discharge circuit means discharges the electric charges stored in the stray capacitor until the input terminals of the differential input circuit come on the same potential.

9. A light measuring system comprising:
    (a) a photo voltaic cell means for producing a sensing output signal which represents the intensity of light incident thereon,
    (b) an operational amplifier means, said operational amplifier means being connected to said photo voltaic cell means and including a differential input circuit consisting of unipolar transistors,
    (c) a bipolar transistor connected to an output terminal of the operational amplifier means,
    (d) a feedback path incorporating one way conductive element means, said feedback path being connected between an output terminal of the bipolar transistor and an inverting input terminal of the differential input circuit, said operational amplifier means producing a control signal having a value in accordance with a logarithm of the sensing output signal,
    (e) a bias means connected to a non inverting input terminal of the differential input circuit for supplying said operational amplifier means with a bias voltage signal,
    (f) a comparison means connected to the bias means and an output terminal of said operational amplifier means, said comparison means comparing the bias voltage signal of said bias means with the control signal of said operational amplifier means and producing a switching means when the bias voltage and the control signal have come into a predetermined relationship,
    (g) a switching means connected to the inverting input terminal of the operational amplifier means for discharging electric charges stored in a stray capacitor inherent in said operational amplifier means when the switching signal from the comparison means is applied to switching means, whereby the operational amplifier means reaches a stability condition speedily, and
    (h) an output means connected to said bipolar transistor.

10. A light measuring system according to claim 9, wherein said bipolar transistor includes a base electrode connected to the output terminal of said operational amplifier means.

11. A light measuring system according to claim 10, wherein said switching means includes an npn type transistor having an emitter electrode connected to the base electrode of said bipolar transistor and a collector electrode connected to the inverting input terminal of said differential input circuit.

12. An automatic control system comprising:
    (a) a photo voltaic cell means for producing a sensing output signal which represents the brightness of an object to be photographed,
    (b) an amplifier means, said amplifier means being connected to said photo voltaic cell means, including a differential input circuit consisting of unipolar transistors, a bipolar type output stage means and a feedback path incorporating one way conductive means and being operative to produce a control signal in response to said sensing output signal,
    (c) a discharge circuit means connected to the differential input circuit of said amplifier means for discharging electric charges stored in a stray capacitor inherent in said amplifier means so that the amplifier means speedily reaches a stability condition, and
    (d) a control means for controlling exposure of film in a camera in accordance with the control signal.

13. An automatic control system comprising;

(a) a photo voltaic cell means for producing a sensing output signal which represents the brightness of an object to be photographed, (b) an operational amplifier means, said operational amplifier means being connected to said photo voltaic cell means and including a differential input circuit consisting of unipolar transistor, (c) a bipolar transistor connected to an output terminal of the operational amplifier means, (d) a feedback path incorporating one way conductive element means, said feedback path being connected between an output terminal of the bipolar transistor and an inverting input terminal of the differential input circuit, said operational amplifier means producing a control signal having a value in accordance with a logarithm of the sensing output signal, (e) a bias means connected to a non inverting input terminal of the differential input circuit for supplying said operational amplifier means with a bias voltage signal, (f) a comparison means connected to the bias means and an output terminal of said operational amplifier means, said comparison means comparing the bias voltage signal of said bias means with the control signal of said operational amplifier means and producing a switching means when the bias voltage and the control signal have come to a predetermined relationship, (g) a switching means connected to the inverting input terminal of the operational amplifier means for discharging electric charges stored in a stray capacitor inherent in said operational amplifier means when the switching signal from the comparison means is applied to switching means, whereby the operational amplifier means reaches a stability condition speedily, and (h) a control means for controlling exposure of film in a camera in accordance with the control signal.

14. A light measuring system comprising:
(a) a photosensitive element having an output terminal;
(b) an amplifier connected to the output terminal of said photosensitive element;
(c) means for compensating the time-lag response of the amplifier caused by stray capacitance within at least said amplifier, said compensating means being connected to said amplifier at an output terminal thereof and provided with a switching element actuated in response to an operative condition of said amplifier upon starting of photometry; and
(d) an output circuit connected to an output terminal of said amplifier.

15. A light measuring system according to claim 14, wherein said photosensitive element includes a photo voltaic cell having an output terminal.

16. A light measuring system according to claim 15, wherein said amplifier includes an operational amplifier having input terminals connected with the output terminal of said photo voltaic cell.

17. A light measuring system according to claim 16, wherein said switching element includes a semiconductor switch.

18. A light measuring system comprising:
(a) a photosensitive element having an output terminal;
(b) an amplifier having an input terminal connected to the output terminal of said photosensitive element and an output terminal;
(c) compensating means for compensating time-lag response of the amplifier generated by stray capacitance within at least said amplifier means, said compensating means including a semiconductor switch having two main current carrying electrodes connected between the input and the output terminals of said amplifier and having a control electrode;
(d) control means for supplying a driving signal to the control electrode of the semiconductor switch for a certain period of time commencing with the starting of photometry, said driving signal being effective to actuate said semiconductor switch to an operative condition; and
(e) an output circuit connected to the output terminal of said amplifier.

19. A light measuring system according to claim 18, wherein said amplifier includes an operational amplifier.

20. A light measuring system according to claim 18, wherein said control means includes a comparison circuit for comparing a reference voltage with an amplified voltage supplied from said amplifier to produce a driving signal until the difference between input voltages of said reference and amplified voltages thus compared reaches a predetermined voltage level.

21. A light measuring system comprising:
(a) a photosensitive element having an output terminal;
(b) an amplifier connected to the output terminal of said photosensitive element;
(c) compensating means for compensating the time-lag response of the amplifier generated by stray capacitance within at least said amplifier, said compensating means being connected to said amplifier at the output terminal thereof and provided with a switching element to be actuated due to an operative condition of said amplifier upon starting of photometry;
(d) means for producing a reference voltage;
(e) a comparison circuit connected with both said reference voltage producing means and said amplifier at the output terminal thereof, said comparison circuit comparing a reference voltage generated in said reference voltage producing means with an amplified output signal emitted from the amplifier means to produce a stop signal which stops the action of said switching element when the relation between the input voltages of said reference voltage and said amplified output signal reaches a predetermined relation; and
(f) an output circuit connected to the output terminal of said amplifier.

22. A light measuring system according to claim 21, wherein said comparison circuit includes a comparator having an inverting terminal connected to the output terminal of said reference voltage producing means and a non-inverting terminal connected to the output terminal of said amplifier, and a second switching element connected to the comparator for producing the stop signal in response to an output signal from the comparator.

23. A light measuring system comprising:
(a) a photosensitive element having an anode and cathode electrode;
(b) an amplifier having an inverting input terminal connected to the cathode electrode of said photosensitive means and a non-inverting input terminal connected to the anode electrode of said photosensitive element;

(c) conversion means for converting a first output signal from the photosensitive element into an electrical signal having a value proportional to a logarithm of the value of the first output signal, said conversion means including a diode having a cathode connected to the inverting input terminal of said amplifier means;

(d) compensating means for compensating the time-lag response of the amplifier means generated by stray capacitance within at least said amplifier, said compensating means being connected to said amplifier at the inverting input terminal thereof and provided with a discharge element which is actuated to an operative condition for discharging an electric charge having been applied to said stray capacitance at the start of photometry; and (e) an output circuit connected to an output terminal of said amplifier.

24. A light measuring system according to claim 23, further comprises:

control means connected with the discharge element for actuating said discharge element for a certain period of time from the start of photometry.

25. A light measuring system according to claim 23, wherein said discharge element includes a switching element having a control electrode and two main current carrying electrodes connected between the inverting input terminal and the output terminal of said amplifier.

26. A light measuring system according to claim 25, wherein said switching element consists of an NPN transistor.

27. A light measuring system comprising:
(a) a photosensitive element having an output terminal;
(b) an amplifier connected to the output terminal of said photosensitive element;
(c) compensating means for compensating the time-lag response of the amplifier means generated by stray capacitance within said amplifier, said compensating means being connected to said amplifier and provided with a discharge element which is actuated to an operative condition at the start of photometry; and
(d) an output circuit connected to an output terminal of said amplifier.

28. A light measuring system comprising:
(a) a photosensitive element having an output terminal;
(b) an amplifier connected to the output terminal of said photosensitive element;
(c) compensating means for compensating the time-lag response of the light measuring system generated by stray capacitence, said compensating means being connected to said amplifier and provided with a switching element which is actuated to an operative condition at the start of photometry; and
(d) an output circuit connected to an output terminal of said amplifier.

29. An exposure control apparatus for camera comprising:
(a) a photosensitive element having an output terminal;

(b) an amplifier connected to the output terminal of said photosensitive element;
(c) compensating means for compensating the time-lag response of the light measuring system generated by stray capacitence, said compensating means being connected to said amplifier and provided with a switching element which is actuated to an operative condition at the start of photometry; and
(d) control means connected to the output terminal of said amplifier for controlling an exposure value in response to an output signal from the amplifier.

30. An exposure control apparatus for camera, comprising:
(a) a photosensitive element having an output terminal;
(b) an amplifier having an input terminal connected to the output terminal of said photosensitive element and an output terminal;
(c) compensating means for compensating for the time-lag response of the amplifier caused by stray capacitence by accelerating the response of the amplifier, said compensating means including a semiconductor switch having two main current carrying electrodes connected between the input and the output terminals of said amplifier and a control electrode;
(d) control means for supplying a driving signal to the control electrode of the semiconductor switch for a certain period of time from starting of photometry, said driving signal being effective to actuate said semiconductor switching means to an operative condition; and
(e) control means connected to the output terminal of said amplifier means for controlling an exposure value in response to an output signal from the amplifier means.

31. An exposure control apparatus for camera, comprising:
(a) a photosensitive element having an output terminal;
(b) an amplifier connected to the output terminal of said photosensitive element, said photosensitive element and said amplifier comprising a light measuring system;
(c) compensating means for compensating the time-lag response of the light measuring system generated by stray capacitence, said compensating means being connected to said amplifier and provided with a switching element which is actuated to an operative condition at the start of photometry;
(d) a means for producing reference voltage;
(e) a comparison circuit connected with both said reference voltage producing means and said amplifier at the output terminal thereof, said comparison circuit comparing a reference voltage generated in said reference voltage producing means with an amplified output signal emitted from the amplifier to produce a stop signal which stops the action of said switching element when the relation between the input voltages of said reference voltage and said amplified output signal reaches a predetermined relation; and
(f) control means connected to the output terminal of said amplifier for controlling an exposure value in response to an output signal from the amplifier.

* * * * *

UNITED STATES PATENT OFFICE
CERTIFICATE OF CORRECTION

Patent No. 4,076,977     Dated February 28, 1978

Inventor(s) Tokuichi Tsunekawa et al

It is certified that error appears in the above-identified patent and that said Letters Patent are hereby corrected as shown below:

In the heading of the patent [30] should read as follows:

--[30] Foreign Application Priority Data

December 28, 1974   Japan..........50-2497
July 2, 1975        Japan..........50-82116--.

Signed and Sealed this

Sixth Day of June 1978

[SEAL]

Attest:

RUTH C. MASON
Attesting Officer

DONALD W. BANNER
Commissioner of Patents and Trademarks